(12) United States Patent
Riesthuis et al.

(10) Patent No.: US 6,699,452 B2
(45) Date of Patent: Mar. 2, 2004

(54) PROCESS FOR THE SEPARATION OF A HYDROXYLAMMONIUM SALT SOLUTION

(75) Inventors: Theodorus F. M. Riesthuis, Maastricht (NL); Werner J. J. Ploumen, Heerlen (NL)

(73) Assignee: DSM N.V., Heerlen (NL)

( * ) Notice: Subject to any disclaimer, the term of this patent is extended or adjusted under 35 U.S.C. 154(b) by 0 days.

(21) Appl. No.: 10/176,087

(22) Filed: Jun. 21, 2002

(65) Prior Publication Data

US 2003/0064016 A1 Apr. 3, 2003

Related U.S. Application Data

(63) Continuation of application No. PCT/NL00/00899, filed on Dec. 5, 2000.

(30) Foreign Application Priority Data

Dec. 21, 1999 (NL) .............................................. 1013899

(51) Int. Cl.$^7$ .......................... C01B 21/20; B01D 37/00
(52) U.S. Cl. ...................... 423/387; 210/767; 210/806; 423/388
(58) Field of Search ................................ 423/387, 388; 210/649, 650, 651, 652, 653, 654, 655, 767, 806, 323.2, 489, 490, 491, 510.1, 500.1

(56) References Cited

U.S. PATENT DOCUMENTS

| 4,414,401 A | * | 11/1983 | Wintermeyer et al. | 549/770 |
| 4,707,294 A | * | 11/1987 | Mathew et al. | 423/387 |
| 5,362,398 A | * | 11/1994 | Kamphuis et al. | 210/651 |
| 5,762,897 A | * | 6/1998 | Chang et al. | 423/387 |
| 5,843,318 A | * | 12/1998 | Sharifian et al. | 210/651 |

FOREIGN PATENT DOCUMENTS

| EP | 0052719 | * | 10/1981 |
| EP | 522634 | | 1/1993 |
| EP | 577213 | | 1/1994 |
| GB | 1134963 | | 11/1968 |

* cited by examiner

*Primary Examiner*—Wayne A. Langel
(74) *Attorney, Agent, or Firm*—Pillsbury Winthrop LLP

(57) ABSTRACT

Process for the separation of a hydroxylammonium salt solution from an aqueous reaction mixture comprising solid catalyst particles by means of filtration, wherein cake filtration through an asymmetric filter is applied, the asymmetric filter comprising at least two layers having different pore diameter, at least one layer being a filter layer, the pore diameter of the filter layer being between 0.1 and 10 μm and the thickness of the filter layer being 10 to 1000 μm.

11 Claims, No Drawings

PROCESS FOR THE SEPARATION OF A HYDROXYLAMMONIUM SALT SOLUTION

This is a continuation of International Application No. PCT/NL00/00899 filed Dec. 5, 2000, which designated the United States.

The invention relates to a process for the separation of a hydroxylammonium salt solution from an aqueous reaction mixture comprising solid catalyst particles by means of filtration.

An important application of hydroxylammonium salts is the preparation of oximes from ketones or aldehydes, in particular the preparation of cyclohexanone oxime from cyclohexanone. For this way of preparation of an oxime a cyclic process is known wherein an acid-buffered reaction medium is kept in circulation via a hydroxylammonium salt synthesis zone and an oxime synthesis zone. The reaction medium is acid-buffered by means of for instance phosphoric acid and/or sulphuric acid and the buffer salts derived from these acids, for instance alkali and/or ammonium salts. In the hydroxylammonium salt synthesis zone, nitrate ions or nitrogen oxides, are converted with hydrogen to hydroxylamine. The hydroxylamine reacts with free buffer acid to produce the corresponding hydroxylammonium salt, which is subsequently led to the oxime synthesis zone where it reacts with a ketone to the corresponding oxime, with release of acid. After separation of the oxime from the reaction medium the reaction medium is recycled to the hydroxylammonium salt synthesis zone and fresh nitrate ions or nitrogen oxides are added, to the reaction medium.

In the case that the hydroxylammonium salt synthesis starts from a solution of phosphoric acid and nitrate the above-mentioned chemical reactions are represented as follows:

1) Preparation of the hydroxylammonium salt:

$2H_3PO_4 + NO_3^- + 3H_2 \rightarrow NH_3OH^+ + 2H_2PO_4^- + 2H_2O$

2) Preparation of the oxime:

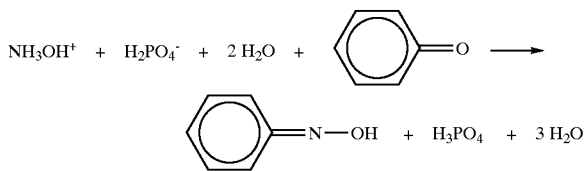
$NH_3OH^+ + H_2PO_4^- + 2H_2O + \text{cyclohexanone} \rightarrow \text{cyclohexanone oxime} + H_3PO_4 + 3H_2O$ 3) Suppletion of fresh nitrate ions in the form of $HNO_3$, after separation of the oxime formed:

$H_3PO_4 + H_2PO_4^- + 3H_2O + HNO_3 \rightarrow 2H_3PO_4 + NO_3^- + 3H_2O$ The first reaction is catalyzed heterogeneously. Preferably, the catalyst is present as finely divided solids as a disperse phase in a liquid reaction mixture.

The reaction mixture of the first step is an aqueous reaction mixture comprising a suspension of solid catalyst particles in a hydroxylammonium salt solution. Before this aqueous reaction mixture is transported to the oxime synthesis zone, the solid catalyst particles are preferably separated from this aqueous reaction mixture resulting in a hydroxylammonium salt solution. The catalyst applied in the preparation of the hydroxylammonium salt mostly consists of a metal from the platinum metal group, for instance Pd or Pd+Pt as active component on a carrier material such as for instance carbon. The catalyst may be activated by the presence of one or more catalyst activators. The catalyst activator may be an element from the group comprising Cu, Ag, Cd, Hg, Ga, In, Tl, Ge, Sn, Pb, As, Sb and Bi. Compounds containing the elements in question may also be used as catalyst activators, for example oxides, nitrates, phosphates, sulphates, halogenides, and acetates. The elements or their compounds can be directly applied to the catalyst as described in U.S. Pat. No. 3,767,758 or they can be added to the reaction medium.

It is known from for example U.S. Pat. No. 5,792,439 that with a Pd+Pt on carbon catalyst a high level of activity and a reasonable degree of selectivity are achieved in the reaction of nitrate to hydroxylammonium salt. It is known from for example WO-A-9818717 that with a Pd on carbon catalyst a higher degree of selectivity in the hydroxylammonium salt synthesis is achieved.

EP-A-577213 describes a process for the separation of a hydroxylammonium salt solution from an aqueous reaction mixture containing solid catalyst particles by means of crossflow filtration.

A drawback of the use crossflow filtration according to EP-A-577213 is that the pores of the filter soon get clogged up by small catalyst particles, so that the flow through the filter is low and backwashing is often required. Consequently the filtration capacity is low.

The aim of the invention is to provide a filtration process with a higher capacity.

This aim is achieved in that cake filtration through an asymmetric filter is applied, the asymmetric filter comprising at least two layers having different pore diameter, at least one layer being a filter layer, the pore diameter of the filter layer being between 0.1 and 10 $\mu$m and the thickness of the filter layer being between 10 to 1000 $\mu$m.

Due to application of a process according to the invention in an existing installation for preparing hydroxylammonium salts, the capacity of the existing installation can be increased.

Cake filtration is a technique in which a layer of solid particles will be deposited on the filter material thereby producing a filter cake. The solid particles are thus retained by the filter, while a liquid phase passes through as filtrate. In the process according to the invention, a layer of catalyst (filter cake) will be deposited on the filter material. Effective functioning of a filter using cake filtration even requires the formation of a filter cake.

The asymmetric filter is composed of several layers and at least of two layers; the pore diameter of one layer is larger than the pore diameter of the other layer. At least one layer being a filter layer. The asymmetric filter will mostly be composed of two layers, one layer having a structural function (the structural layer) and the other layer constituting the actual filter (the filter layer). The pore diameter of the structural layer is larger than that of the filter layer. Where the term 'pore diameter' is used in this description, the pore diameter of the filter layer is always meant. The thickness of the filter layer is 10 to 1000 $\mu$m. The thickness of the filter layer is preferably 100 to 500 $\mu$m. The thickness of the filter layer of an asymmetric filter according to the invention is normally equal to 1 to of the wall thickness of the filter.

The pore diameter of the filter layer is between 0.1 and 10 $\mu$m, preferably between 1 and 5 $\mu$m.

The catalyst particles have in general an average size of between 5 and 150 $\mu$m, preferably between 10 $\mu$m and 60 $\mu$m. By "average particle size" is meant that 50 vol % of the particles are larger than the specified diameter. In particular, within said diameter range and size range, respectively, the average size of the catalyst particles is larger than the average pore diameter of the filter layer.

The filter medium is in general a microporous substance such as for instance carbon, sintered metal, polymers and materials of ceramic origin, such as for instance $Al_2O_3$ en SiC. By preference the material of which the filter medium consists is SiC, carbon or sintered metal.

According to the state of the art, separation of solid catalyst particles from a hydroxylammonium salt solution can also be performed by cake the separation is carried out according to the process of claim 1 filtration through a normal filter with a thickness of 2–5 mm and a pore diameter of 0.5–50 μm.

This involves a great pressure drop across the filter, which is in part due to the constitution of a thick filter cake. This filter also gets clogged by small catalyst particles.

In the process according to the invention, an asymmetric filter with a thinner filter layer is used resulting in a reduction of the rate and the intensity of clogging by small catalyst particles. The pressure drop across an asymmetric filter is lower than the pressure drop across a normal filter of the same overall thickness. It has surprisingly been found that when an asymmetric filter is used the pressure drop across the filter cake is also lower, so that it is possible to work with a much lower pressure drop than expected. An additional advantage of this is that owing to the low pressure drop the occurrence of filter rupture is reduced. Moreover, in comparison with a normal cake filtration, the filtration capacity increases when an asymmetric filter is used.

The temperature at which the filtration is carried out will in part depend on the temperature which prevails in the hydroxylammonium salt synthesis zone and in part on the thermal stability of the filter medium. The filtration is in general carried out at a temperature of 25–100° C. and by preference at 45–65° C.

The pressure at which the filtration is effected, as well as the pressure difference, will depend on the process pressure prevailing in the hydroxylammonium salt synthesis zone. The pressure to be applied will in general lie between 0 and 5 MPa. The pressure will preferably lie between 1 and 4 MPa. The pressure difference across the filter medium will depend on the filter medium and on the desired capacity of the filter. In general the pressure difference can be low due to the use of the asymmetric filters and will lie between 0 and 0.4 MPa. By preference a pressure difference between 0.02 and 0.07 MPa is applied.

The invention also relates to a process for the preparation and purification of a hydroxylammonium salt solution, wherein the hydroxylammonium salt solution is separated from an aqueous reaction mixture containing inter alia solid catalyst particles by means of the filtration process as described above. In one embodiment of this invention, the hydroxylammonium salt is filtered with the process as described above, part of the dissolved hydroxylammonium salt being separated off and the remaining aqueous reaction mixture, including the heterogeneous catalyst, being returned to the hydroxylammonium salt synthesis zone.

The catalyst used in the preparation of a hydroxylammonium salt solution preferably is a Pd on carbon or a Pd+Pt on carbon catalyst. The Pd on carbon catalyst in general has a Pd content of 1 to 25 wt. %, by preference 7 to 20 wt. %. The Pd+Pt on carbon catalyst in general has a (Pd+Pt) content of 1 to 20 wt. %, by preference 5 to 15 wt. %. The Pd:Pt weight ratio is in general between 1:1 and 10:1.

The catalyst concentration is in general between 0.001 and 0.1 gram of catalyst per gram of reaction mixture. The catalyst concentration is by preference between 0.005 and 0.05 gram of catalyst per gram of reaction mixture.

The invention will be further elucidated by means of the following examples without being limited thereto.

EXAMPLES

A hydroxylammonium salt solution was freed of catalyst particles by filtering it. The average particle size of the catalyst particles was 20 μm. The solution was filtered for a certain period of time across:

1. an asymmetric candle filter (Krebsoge, type Sika-R3 AS) having a filter layer pore diameter of 3 μm, an overall wall thickness of 2.2 mm and a filter layer thickness of 200 μm (Example I);
2. a normal candle filter (Krebsoge, type Sika-R3 IS) having a pore diameter of 3 μm and a wall thickness of 2.2 mm (Comparative Experiment A);
3. a filter (LCL, F 55 C 0505 C) having a pore diameter of 0.5 μm and a wall thickness of 1.5 mm, with application of crossflow filtration (Comparative Experiment B).

When the results of the filtration process according to Example 1 and Comparative Experiment A are compared with each other, it is clearly seen that the flow per square metre at the same pressure is much higher for the asymmetric filter than for a normal filter. Also, the pressure drop across the asymmetric filter remains low for a long time, which is indicative of less clogging of the filter. Further, the pressure drop in the case of the asymmetric filter is much lower than across the normal filter.

These two effects together show that the asymmetric filter has a much higher filtration capacity than the normal filter.

From Comparative Experiment B, it can be seen that crossflow filtration could only be continued for two days because the pressure drop became too high due to clogging of the filter.

TABLE 1

| Days in operation | Pressure drop (MPa) | Flow ($m^3/h.m^2$) | Flow at 0.1 MPa ($m^3/h.m^2$) |
|---|---|---|---|
| Example I | | | |
| 1 | 0.021 | 0.30 | 1.43 |
| 6 | 0.032 | 0.47 | 1.47 |
| 13 | 0.020 | 0.28 | 1.37 |
| 20 | 0.022 | 0.30 | 1.38 |
| 40 | 0.022 | 0.32 | 1.47 |
| Comparative Experiment A | | | |
| 4 | 0.049 | 0.31 | 0.63 |
| 11 | 0.050 | 0.30 | 0.59 |
| 18 | 0.058 | 0.25 | 0.43 |
| 25 | 0.067 | 0.27 | 0.41 |
| 32 | 0.099 | 0.33 | 0.34 |
| Comparative Experiment B | | | |
| 1 | 0.05 | | |
| 2 | 0.4 | | |

What is claimed is:

1. Process for the separation of a hydroxylammonium salt solution from an aqueous reaction mixture comprising solid catalyst particles by means of filtration, said process comprising subjecting said aqueous reaction mixture to cake filtration through an asymmetric filter, wherein the asymmetric filter comprises at least two layers having different pore diameters, at least one layer being a filter layer, the pore diameter of the filter layer being between 0.1 and 10 μm and the thickness of the filter layer being between 10 to 1000 μm.

2. Process according to claim 1, wherein the pore diameter of the filter layer is between 1 and 5 μm.

3. Process according to claim 1, wherein the thickness of the filter layer is 100–500 μm.

4. Process according to claim 1, wherein the thickness of the filter layer of the asymmetric filter is equal to 1–25% of the wall thickness of the filter.

5. Process according to claim 1, wherein the asymmetric filter is an asymmetric candle filter.

6. Process according to claim 1, wherein the pressure drop across the asymmetric filter is between 0 and 0.4 MPa.

7. Process according to claim 1, wherein the pressure drop across the asymmetric filter is between 0.02 and 0.07 MPa.

8. Process according to claim 1, wherein the catalyst particles have an average size of 10–60 $\mu$m.

9. Process according to claim 1, wherein the catalyst particles are Pd on carbon catalyst particles.

10. Process according to claim 1, wherein the catalyst particles are Pd+Pt on carbon catalyst particles.

11. Process for the preparation and purification of a hydroxylammonium salt solution, wherein the hydroxylammonium salt solution is separated by means of filtration from an aqueous reaction mixture comprising solid catalyst particles, wherein the separation is carried out according to the process of claim 1.

* * * * *